(12) United States Patent
Michalski et al.

(10) Patent No.: US 7,293,421 B2
(45) Date of Patent: Nov. 13, 2007

(54) METHOD FOR COOLING A PRODUCT, PARTICULARLY, FOR LIQUEFYING A GAS, AND DEVICE FOR IMPLEMENTING THIS METHOD

(75) Inventors: Pierre Michalski, Le Havre (FR); Pierre Gourmelen, Landeda (FR); Claude Blaizat, Bellot (FR)

(73) Assignee: Gaz Transport et Technigaz, Saint-Remy-les-Chevreuse (FR)

( * ) Notice: Subject to any disclaimer, the term of this patent is extended or adjusted under 35 U.S.C. 154(b) by 148 days.

(21) Appl. No.: 10/558,645

(22) PCT Filed: Jun. 4, 2004

(86) PCT No.: PCT/FR2004/001388

§ 371 (c)(1),
(2), (4) Date: Nov. 30, 2005

(87) PCT Pub. No.: WO2004/111556

PCT Pub. Date: Dec. 23, 2004

(65) Prior Publication Data

US 2006/0254290 A1    Nov. 16, 2006

(30) Foreign Application Priority Data

Jun. 6, 2003  (FR) .................................. 03 06839

(51) Int. Cl.
*F25B 15/00*  (2006.01)
(52) U.S. Cl. .......................... 62/101; 62/475
(58) Field of Classification Search .................. 62/101, 62/476
See application file for complete search history.

(56) References Cited

U.S. PATENT DOCUMENTS

| 4,827,728 | A | | 5/1989 | DeVault et al. | |
|---|---|---|---|---|---|
| 5,339,649 | A | | 8/1994 | Kawai et al. | |
| 5,729,988 | A | * | 3/1998 | Tchernev | 62/106 |
| 5,761,925 | A | | 6/1998 | Maeda | |
| 5,813,248 | A | * | 9/1998 | Zornes et al. | 62/480 |

FOREIGN PATENT DOCUMENTS

EP    1 111 315    6/2001

* cited by examiner

*Primary Examiner*—Melvin Jones
(74) *Attorney, Agent, or Firm*—Young & Thompson

(57) ABSTRACT

A method for cooling a product (P) including N ordered adsorption/desorption cycles (100, 200, 300), each cycle having the following steps: expanding a refrigerant in liquid phase from a condenser (101, 201, 301) inside an evaporator (103, 203, 303) for evaporating at least one portion of the refrigerant, and; adsorbing this refrigerant in vapor phase inside at least one adsorption/desorption chamber (120, 220, 320) containing a zeolite adsorbent (Z) whereby cooling a remaining portion of the refrigerant in the evaporator to a predetermined low temperature, the low temperature decreasing from one cycle to the next. The method also includes the following steps: effecting N-1 heat exchanges each time the refrigerant enters the evaporator (103, 203) of a cycle and each time the refrigerant enters the condenser (201, 301) of the following cycle for condensing the refrigerant in the condenser.

35 Claims, 6 Drawing Sheets

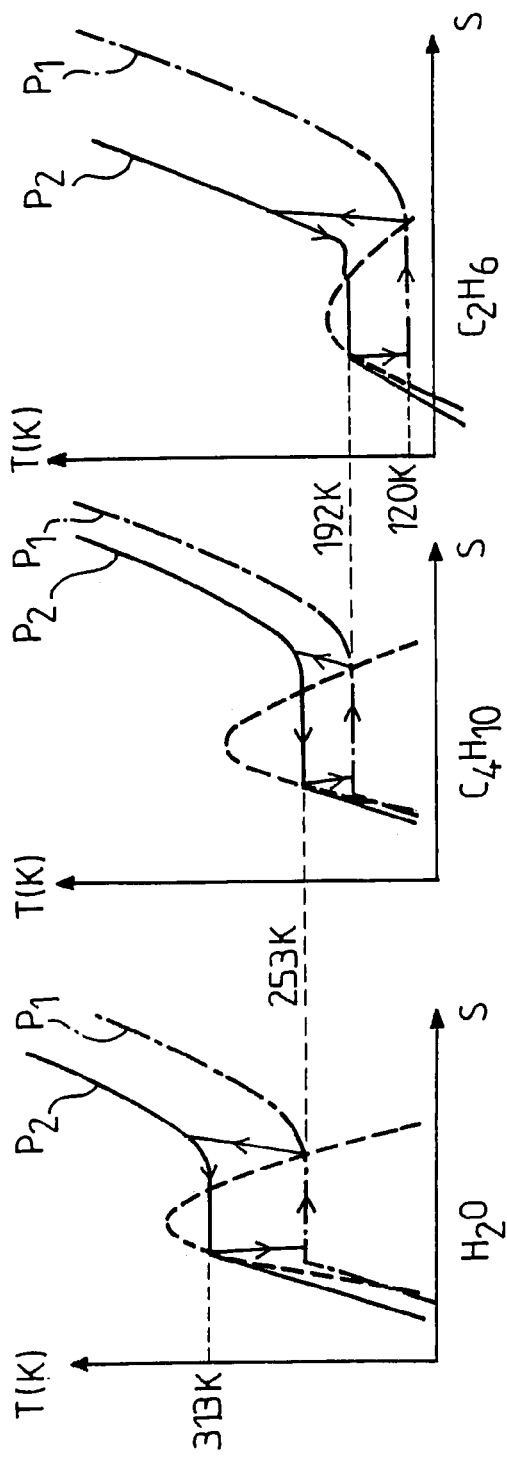
FIG.8
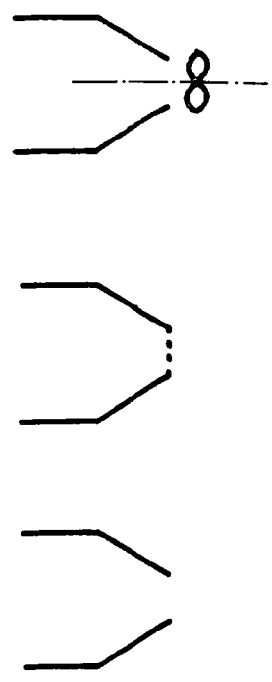
FIG.12
FIG.11
FIG.10
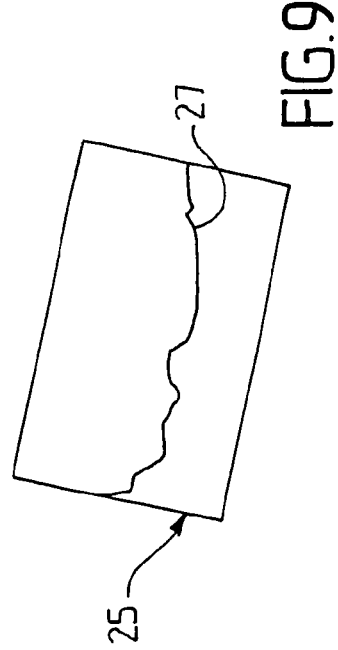
FIG.9

METHOD FOR COOLING A PRODUCT, PARTICULARLY, FOR LIQUEFYING A GAS, AND DEVICE FOR IMPLEMENTING THIS METHOD

The present invention relates to a method for cooling a product and to a device for implementing it. Such a method can be implemented in particular for liquefying a product such as natural gas.

FR 2 489 101 discloses a cooling method and a device for implementing it which call upon the properties of the zeolite/water pair. However, the teachings of that document do not allow very low temperatures to be achieved.

Methods for liquefying a product in the vapor phase, in which, starting out from an initial state in the vapor phase, close to normal temperature and pressure conditions, the product is subjected to isothermal compression by as much as a few tens or even a few hundred bar, then to isobaric cooling, and finally to isenthalpic expansion in order to attain a final state in the liquid phase that is unstable at normal, namely atmospheric, pressure, are known. A method such as this is represented by curve B in FIG. 3, the initial state being indicated by the point A. Such methods, for example the CLAUDE and LINDE methods, in particular allow the constituent parts of dehydrated air to be liquefied and separated. To do that, large compressors are needed, and this leads to a significant expenditure in electrical or mechanical energy, that is to say secondary energy. Such a liquefaction method is an open conversion applied directly to the fluid product that is to be cooled and therefore does not require any separate refrigerating fluid. Disadvantages are the energy expenditure needed for compressing the product to a supercritical state and the low proportion of the product that contributes to the wanted effect (a liquid phase). Such a method allows large temperature differences to be achieved at the expense of a great deal of energy expenditure.

U.S. Pat. No. 5,339,649 describes a two-stage cryogenic refrigerator for liquefying helium intended to cool a superconductor magnet. In the coldest stage, the refrigerating fluid is helium which is desorbed at a pressure of between 14 and 18 atm by heating the adsorbent. This supercritical helium is not liquefied until downstream of the Joule-Thomson expansion valve. In the other stage, the refrigerating fluid is hydrogen and a chemical absorbent such as $LaNi_5$ is used. Here again, the hydrogen is not liquefied until downstream of the Joule-Thomson expansion valve. Each time, there is only a fraction of the fluid to be liquefied and which therefore contributes to the refrigerating effect. The isochoric compression of the fluid in the adsorption chamber has the advantage of using up heat rather than secondary energy. However, isochoric compression is more expensive in energy than any other form of compression (isothermal, adiabatic). The obtaining of helium and of supercritical hydrogen thus entails a very great expenditure in energy, proportional on the whole to the pressure difference, and this weighs heavily on the energy efficiency of this machine. In addition, the Joule-Thomson expansion of hydrogen does not allow the hydrogen to be liquefied unless sufficient precooling has been achieved. This precooling is achieved by exchange of heat with a reserve of liquid nitrogen. The consumption of liquid nitrogen also weighs heavily on the energy efficiency of this refrigerator. This refrigerator is a low-power small-sized machine designed to be installed onboard a vehicle. Its low efficiency, which stems from the low fraction of fluid actually liquefied, from the cost of compression and from the consumption of liquid nitrogen as a hot source to which the heat is transferred, makes it ill-suited to higher-powered applications.

The invention aims to provide a cooling method which can be applied in particular to the liquefaction of a gas, which is less expensive in terms of energy and which makes it possible to obtain a wide range of final temperatures, particularly very low temperatures. Another object of the invention is to provide a method and a device which are able to produce coldness with high power and good energy efficiency, particularly in the temperature range between −80° C. and −220° C. Yet another object is to propose an installation that allows the temperature to be lowered to the desired temperature while at the same time complying with constraints concerned with the mass of the plant, the cost of cooling in terms of energy, and the dependability and reliability of the plant.

To do that, the invention provides a method for cooling a product comprising N ordered adsorption/desorption cycles performed under vacuum, N being an integer greater than 1, each cycle comprising the steps consisting in:

extracting heat from a refrigerating fluid in the vapor phase in a condenser at a first pressure below the critical pressure of said fluid for condensing said refrigerating fluid, introducing said refrigerating fluid in the liquid phase into an evaporator at a second pressure lower than the first pressure in order to vaporize some of said refrigerating fluid and cool the rest of said refrigerating fluid to a vaporization temperature of said refrigerating fluid at said second pressure, said vaporization temperature decreasing from one cycle to the next, said first and second pressures being chosen in each cycle so that said vaporization temperature in one cycle is each time lower than the condensation temperature of the refrigeration fluid in the next cycle at the first pressure of said next cycle, supplying heat to the liquid fraction of the refrigerating fluid at said second pressure in said evaporator in order to evaporate said refrigerating fluid, adsorbing said refrigerating fluid in the vapor phase in at least one adsorption/desorption chamber connected to said evaporator and containing a zeolite adsorbent, once a quantity of said refrigerating fluid has been adsorbed into said zeolite adsorbent, regenerating said zeolite adsorbent by heating in order to desorb said quantity of refrigerating fluid in the vapor phase, returning said quantity of refrigerating fluid in the vapor phase to said condenser, said method further comprising the steps consisting in: performing N-1 heat exchanges, each performed between the refrigerating fluid in the evaporator of one cycle and the refrigerating fluid in the condenser of the next cycle in the order of the cycles in order thus to supply said heat to said evaporator and extract said heat in said condenser, and cooling said product by exchange of heat with the refrigerating fluid at least in the evaporator of the last cycle.

The zeolite is an adsorbent clay which has the ability to fix numerous bodies and which is available at low cost. For example, at normal or ambient temperature it is able to fix water up to more than 25% of its own weight. The adsorption is exothermal and the desorption is endothermal. During adsorption of water, about 3500 kJ are released per kg of water fixed. The zeolite can also be sized to act like a molecular sieve, so as to select which bodies to adsorb against a molecular-size criterion.

In each cycle, adsorption of the vapor phase in the adsorption/desorption chamber acts like a pumping action which lowers the partial pressure of the refrigerating fluid and thus shifts the phase equilibrium in the evaporator so as to sustain the vaporization of the refrigerating fluid, and this cools the evaporator through the extraction of latent heat of vaporization. This pumping action is obtained in a physico-chemical manner without supplying mechanical work. The method thus uses only a small amount of secondary energy, in order to circulate the refrigerating fluid. The latent heat removed in the evaporator of one cycle is compensated for on each occasion by an extraction of heat in the condenser of the next cycle, allowing the refrigerating fluid to be condensed in the condenser. In addition, this extraction of latent heat is used, at least in the last cycle, to cool the target product.

Regeneration consists in heating the adsorbent to reduce its adsorbtivity and thus desorb the fluid. The regeneration temperature for the zeolite may be chosen in each cycle so as to cause total or almost total desorption of the corresponding refrigerating fluid. However, as zeolite is a very poor conductor of heat, total desorption takes a long time. For preference, desorption is therefore performed partially, for example down to a content of 10% by weight, so as to accelerate the dynamics of the method.

Thus, the refrigerating fluid in each cycle is recirculated and can circulate in a closed circuit for a long time. Most of the energy consumed by the method, namely for regenerating the adsorbent, can be provided in the form of heat, that is to say in the form of primary energy.

Advantageously, a separate refrigerating fluid is used in each cycle, each refrigerating fluid being selected so that it exhibits a vaporization temperature at the second pressure of the corresponding cycle which is below the condensation temperature at the first pressure of the fluid used in the previous cycle, so that the transfer of heat from the fluid that is to be condensed to the fluid that is to be evaporated can occur. The criteria against which the fluids are selected are, in each instance, the intrinsic properties of the fluid: latent heat of change of state, liquid-vapor then solid-vapor equilibrium curve, critical temperature, triple point temperature, compatibility with the containment material, potential risks (explosion, toxicity), and the properties of the fluid/zeolite adsorbent pair: adsorption curve (rate of adsorption as a function of temperature), stability of the fluid in the presence of the zeolite. Having eliminated fluids that may present unacceptable risks, those which will allow the cascade to work are sorted according to the principle whereby evaporation in one stage is performed as a result of condensation in the next stage.

The refrigerating fluids are also chosen on the basis of the ability of the zeolite to perform significant and effective adsorption and on the basis of the corresponding heat adsorption. The expected adsorption rates may range up to 30% (for example 30% by mass of water in the case of zeolite 13X, 20% by mass of water for zeolite 4A). The desorption temperatures can vary (250° C. for water on zeolite 4A, 70° C. for nitrogen on zeolite 4A, 90° C. for water on zeolite 13X). In all cases, adsorption is high at low temperature. The heats of adsorption are of the order of magnitude of 1.5 times the latent heat of vaporization of the adsorbed fluid.

According to some particular embodiments of the invention, said refrigerating fluids are chosen from water (Tb=100° C.), butane (Tb=−0.5° C.), ammonia (Tb=−33° C.), carbon dioxide (Tb=−37° C.), propane (Tb=−42° C.), acetylene (Tb=−84° C.), ethane (Tb=−88° C.), ethylene (Tb=−103.9° C.), xenon (Tb=−108° C.), krypton (Tb=−152° C.), methane (Tb=−161.6° C.), argon (Tb=−185° C.), nitrogen (Tb=−195.5° C.) and neon (Tb=−245.92° C.), where Tb denotes the boiling point at normal pressure. All these fluids, or at least some of them, can thus be used, in this order or in some other order, in the successive cycles. For example, the refrigerating fluid in the first cycle is water.

Advantageously, in at least one of said cycles, preferably in all the cycles, said refrigerating fluid has a latent heat of vaporization higher than 300 kJ/kg, preferably greater than or equal to about 450 kJ/kg. The higher the exchanges of energy need to be, the more appropriate it is to use fluids with a high latent heat. A minimum threshold value of 300 kJ/kg for a fluid in the sequence of fluids, for a general value of around 450 kJ/kg for example is reasonable in a methane liquefaction plant. For smaller-sized plants that allow temperatures to be reduced to lower values, this threshold may be lowered.

Advantageously, in at least one of said cycles, preferably in all the cycles, the temperature in the evaporator is above the triple point of said refrigerating fluid. Thus, a liquid phase rather than a solid phase is obtained in the evaporator, allowing for more effective heat exchanges. In other words, the critical pressure of the fluid needs to be higher than the first pressure (the high pressure) of the cycle, and the triple point temperature needs if possible to be below the low temperature of the fluid, corresponding to the second pressure. However, the latter technical constraint may be lifted depending on the design of the exchangers.

As a preference, in at least one of said cycles, preferably in all said cycles, the first pressure in said condenser is lower than 3 bar, for example between 0.4 and 3 bar, and preferably close to normal pressure. Thus, the expenditure of energy needed to compress the refrigerating fluid to the first pressure is lower.

The temperature in each condenser is, on each occasion, the condensation temperature of the corresponding fluid at the first pressure obtaining in the condenser which may be normal pressure or some other pressure. During desorption, it is possible to compress a fluid to a comfortable pressure above normal pressure, for example to 2 atm, in order to increase its condensation temperature in such a way as to tailor it to the evaporation temperature of the fluid in the evaporator of the previous stage.

Advantageously, in at least one of said cycles, preferably in all said cycles, the maximum pressure is lower than 5 bar, preferably lower than 3 bar, and more preferably still close to normal pressure. The mass of the plant for implementing the method is very sensitive to the high pressure of each of the cycles. For reasons of mechanical strength of the chambers and of thermal inertia of the components, high pressures need to be limited as far as possible. Thus, it is not necessary to build a plant able to tolerate large pressure differences. The cost and the dependability of the refrigeration plant are thus improved.

The reliability of the plant is dependent on the leaktightness of the chambers. It is therefore appropriate to avoid working at excessively low low pressures. A minimum absolute pressure of 0.5 kPa or higher is, for example, a reasonable value for each of the cycles.

For preference, in at least one of said cycles, said refrigerating fluid in the liquid phase is introduced in atomized form into the evaporator. Thus evaporation is speeded up and the refrigeration power is therefore improved.

For preference, said extraction of heat in the condenser of the first cycle is performed by exchange of heat with an environmental fluid at ambient temperature. This environmental fluid to which the heat of condensation of the first cycle is removed and which therefore constitutes the hot source with respect to the refrigeration machine employing the above method, may for example be atmospheric air or water from a river, a lake or the sea.

Advantageously, in at least one of said cycles, the heating of said zeolite adsorbent to be regenerated is performed by exchange of heat with an environmental fluid at ambient temperature. For example, regeneration is thus performed in the second cycle and in the next cycles as appropriate.

Advantageously, the method according to the invention comprises the step that consists in performing at least one exchange of heat, preferably at least N-1 exchanges of heat, each heat exchange being between said zeolite adsorbent undergoing adsorption in an adsorption/desorption chamber of one cycle and said zeolite adsorbent undergoing regeneration in an adsorption/desorption chamber of the next cycle. Thus, the exchanges of heat between the adsorption/desorption chamber of one cycle and the adsorption/desorption chamber of the next cycle allow regeneration to be performed without supplying heat from the outside, except in the case of the regeneration of the first cycle. However, even for the first cycle, that is to say the cycle at which the highest high temperature is attained, the method may be designed to operate at a relatively low temperature, for example 250° C. in the case of the zeolite/water pair. As a result, it is easy to procure a hot source at the regeneration temperature for the first cycle. The method may thus operate in cogeneration with an industrial plant that produces heat as effluent, such as a heat engine.

Adsorption is an exothermal reaction and the adsorbtivity of the zeolite decreases as its temperature increases. For preference, in each cycle, it is anticipated for the zeolite adsorbent to be cooled in the adsorption/desorption chamber in which said refrigerating fluid is adsorbed. In this way, the adsorbent can be kept at a suitable operating temperature.

For preference, a step is provided that consists in performing at least one exchange of heat, preferably N-1 exchanges of heat, each heat exchange being between the refrigerating fluid in the evaporator of one cycle and said zeolite adsorbent in the adsorption/desorption chamber of the next cycle undergoing adsorption, in order to cool said zeolite adsorbent. Thus, the cooling of the zeolite undergoing adsorption is obtained without any additional energy consumption.

Advantageously, in each cycle, there are at least two adsorption/desorption chambers, so that said adsorption of the refrigerating fluid can be performed in one of said adsorption/desorption chambers while at the same time said regeneration of the zeolite adsorbent is being performed in another of said adsorption/desorption chambers.

For preference, in each cycle, there are at least three adsorption/desorption chambers so that a step of cooling the zeolite adsorbent after regeneration can also be performed at the same time in yet another of said adsorption/desorption chambers. Thus, each adsorption/desorption chamber carries out three steps in succession: an adsorption step, during which it is preferable to cool the adsorbent, a regeneration or desorption step, during which the adsorbent is heated, and a post-regeneration cooling step during which the adsorbent is cooled before adsorption is resumed.

For preference, there is provided the step that consists in performing at least one exchange of heat, preferably N-1 exchanges of heat, each heat exchange being between the refrigerating fluid in the evaporator of one cycle and said zeolite adsorbent in the adsorption/desorption chamber of the next cycle undergoing post-regeneration cooling. Thus, the cooling of the zeolite after regeneration can be obtained without additional energy consumption.

Advantageously, there is provided the step that consists, in at least one of said cycles, preferably in each of said cycles, in cooling said quantity of refrigerating fluid in the vapor phase by exchange of heat with a source at ambient temperature before said quantity of refrigerating fluid is reintroduced into the condenser. Thus, the refrigerating fluid can be cooled in two steps in order to condense it: first of all by exchange of heat with a source at ambient temperature, then in the condenser by exchange of heat with the evaporator of the previous cycle. This is particularly advantageous when the target condensation temperature is below ambient temperature. When the target condensation temperature is above ambient temperature, the exchange of heat with a source at ambient temperature may be enough to obtain the desired condensation.

Within the meaning of the invention, the expression "under vacuum" means that the cycles take place under a reduced partial pressure of air, the strength of the vacuum varying according to the rate of transfer that is to be obtained. Advantageously, the partial pressure of air in each cycle is less than about 1 kPa, preferably less than about 0.1 kPa. To do that, a vacuum pump is preferably provided in each stage, because of the imperfect leaktightness. It is also advantageous to provide a vacuum pump connected to said or each adsorption/desorption chamber, in order to remove from the chamber any air and/or non-adsorbable impurities that were initially dissolved in the refrigerating fluid.

The low temperature of the last cycle is chosen according to the application. For example, it may range between $-40°$ C. and $-220°$ C. A very low temperature is suitable in particular for liquefying certain gases.

Advantageously, the product to be cooled is initially in the vapor phase and said product is cooled, particularly more or less isobarically, in order to liquefy it. This method allows a body, for example, methane or the constituent components of air, to be liquefied without using a high pressure, something which presents advantages in terms of equipment cost and dependability.

The product to be cooled may be of any kind. According to one particular embodiment of the invention, said product is a gas used as a fuel or as a polymerizable raw material, for example liquefied petroleum gas, methane, ethane, propane, butane, ethylene, propylene, hydrogen and the like, particularly so that said product can be loaded on board a liquid fuel gas transport ship or for land-based plants.

According to another particular embodiment of the invention, the product is a gas for use as a raw material, for example liquid air, nitrogen and oxygen, that is cooled or liquefied to between $-80°$ C. and $-220°$ C.

In an embodiment variant, a step is provided that consists in performing at least one exchange of heat, preferably N-1 exchanges of heat, each heat exchange being between the refrigerating fluid in the condenser of one cycle and said zeolite adsorbent at said high temperature of the next cycle, said intermediate temperature of one cycle each time being higher than or equal to said high temperature of the next cycle. In this case, the high temperature and the intermediate temperature are also chosen to decrease from one cycle to the next. However, it is necessary to have good control over the conditions of condensation of the refrigerating fluid in the condenser, particularly over the temperature, in order to be able to use the heat of condensation according to this variant.

The invention also provides a device for implementing the aforementioned method, comprising N ordered cooling stages performed under vacuum, N being an integer greater than 1, each stage comprising:
- a condenser able to contain a refrigerating fluid in a liquid phase,
- an evaporator connected to said condenser by a pipe,
- at least one adsorption/desorption chamber containing a zeolite adsorbent and connected to said evaporator via an upstream valve,
- a pipe equipped with a downstream valve for returning the refrigerating fluid from said adsorption/desorption chamber to said condenser,
- a heating means in said or each adsorption/desorption chamber able to heat said zeolite adsorbent to a regeneration temperature, said device comprising N-1 heat exchangers each arranged in such a way as to exchange heat between the refrigerating fluid in the evaporator of one stage and the refrigerating fluid in the condenser of the next stage in the order of the cycles in order to cool this fluid, and a final heat exchanger arranged in such a way as to exchange heat between a product that is to be cooled and the refrigerating fluid in at least the evaporator of the last stage.

For preference, in at least one of said stages, a cooling chamber for cooling the refrigerating fluid is arranged between said or each adsorption/desorption chamber and said condenser and is in thermal contact with a source of heat at ambient temperature.

Advantageously, the device according to the invention comprises, by way of heating means for heating said adsorption/desorption chambers, at least one heat exchanger, preferably at least N-1 heat exchangers, each arranged in such a way as to exchange heat between said zeolite adsorbent undergoing adsorption in said or one of said adsorption/desorption chamber(s) of one stage and said zeolite adsorbent undergoing regeneration in said or one of said adsorption/desorption chamber(s) of the next stage.

Advantageously, a cooling means is provided in said or each adsorption/desorption chamber in order to cool said zeolite adsorbent undergoing adsorption.

Advantageously, the device comprises, by way of cooling means for cooling said adsorption/desorption chambers, at least N-1 heat exchangers each arranged in such a way as to exchange heat between the refrigerating fluid in the evaporator of one stage and said zeolite adsorbent in said or each adsorption/desorption chamber of the next stage.

For preference, each stage comprises at least two, preferably three, adsorption/desorption chambers each connected to said evaporator via a respective upstream valve and to said condenser via a respective downstream valve. Thus, the device can operate continuously, adsorption being carried out as a concurrent operation in each chamber in succession while the other chambers are respectively undergoing regeneration and post-regeneration cooling.

Advantageously, the device comprises a means of controlling said valves which is programmed to open and close said upstream and downstream valves in a cycle of concurrent operations, in which each chamber performs in succession an adsorption step, for which the upstream valve is open and the downstream valve is closed, a regeneration or desorption step for which the downstream valve is open and the upstream valve is closed, and a post-regeneration cooling step for which the downstream valve and the upstream valve are closed.

According to an embodiment variant, provided that the conditions of condensation of the fluid in the condenser are well controlled, it is possible to provide, by way of heating means for heating said adsorption/desorption chambers, at least one heat exchanger, preferably at least N-1 heat exchangers, each designed to exchange heat between the refrigerating fluid in the condenser of one stage and said zeolite adsorbent in said or each adsorption/desorption chamber(s) of the next stage.

According to one particular embodiment of the invention, the device is associated with a chamber containing said product that is to be cooled, said final heat exchanger being supported within said chamber in order to exchange heat between the refrigerating fluid in the evaporator of the last stage and the product in the liquid or vapor phase contained in said chamber.

The invention also provides a methane tanker equipped with a storage tank for liquefied gas, with which a device as embodied hereinabove is associated by way of a refrigerating re-liquefaction unit.

The invention also provides a gas-liquefaction plant comprising a cooling chamber for cooling the gas that is to be liquefied, which chamber is associated with a device as embodied hereinabove.

The invention will be better understood and other objects, details, features and advantages thereof will become more clearly apparent in the course of the following description of some particular embodiments of the invention which are given solely by way of nonlimiting illustration with reference to the attached drawings. In these drawings:

FIG. 8 is a thermodynamic diagram representing the temperature and pressure conditions in the three stages of the machine of FIG. 6;

FIG. 9 is a schematic depiction of a plate-type heat exchanger;

FIGS. 10 to 12 depict embodiments of a device for breaking up a liquid jet.

Figure 1:
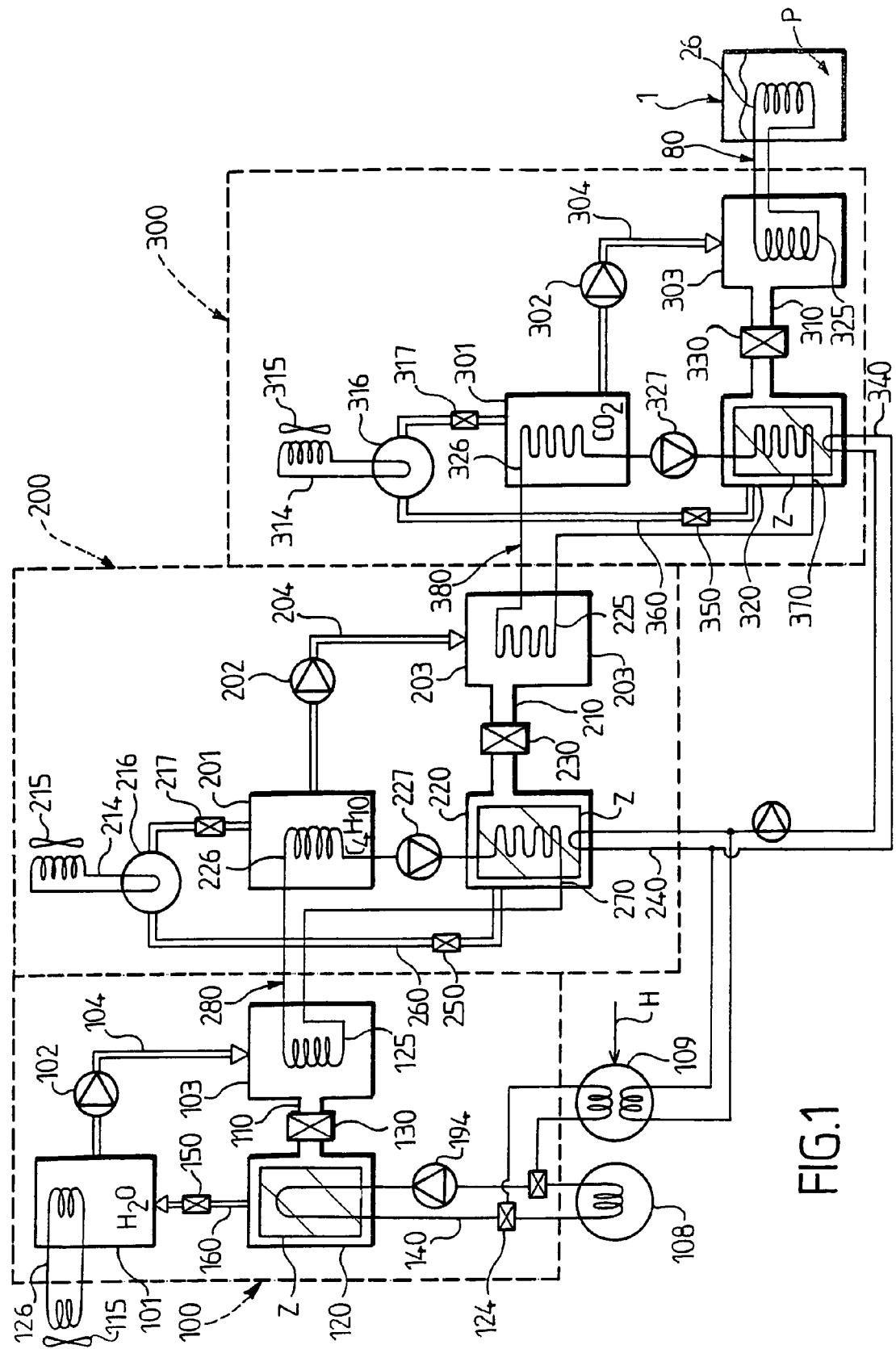
FIG. 1 is a diagrammatic depiction of a multi-stage cooling machine with three stages for implementing the method according to a first embodiment of the invention.

With reference to FIG. 1 a multi-stage cooling machine comprising three stages numbered 100, 200 and 300 will now be described. Each stage comprises a refrigerating fluid circuit of similar design and operation, in which a vacuum has been created and which will be described in greater detail with reference to the first stage 100. In the next stages, analogous elements bear the same reference numeral increased by one or two hundred.

In the first stage 100, the refrigerating fluid is water $H_2O$. The refrigerating fluid circuit comprises a condenser 101 connected via pipe 104 provided with a circulating pump 102 to an evaporator 103. The evaporator 103 is connected via pipe 110 equipped with an upstream valve 130 to an adsorption/desorption chamber 120. The chamber 120 contains a block of zeolite Z by way of adsorbent. The adsorption/desorption chamber 120 is connected via pipe 160 equipped with a downstream valve 150 to the condenser 101. In the condenser 101, the water is in liquid phase at 1 atmosphere of pressure and at an intermediate temperature of below 100° C., for example of around 80° C. The entire refrigerating fluid circuit is under vacuum, for example with a partial pressure of air of below 0.1 millibar (mbar). For that, each adsorption/desorption chamber is connected to a vacuum pump which will be described with reference to FIG. 2. The partial pressures obtained may be monitored using a gas analyzer of known type.

Under the action of the circulating pump 102, the water in the liquid phase is injected through the pipe 104 into the evaporator 103 in which it falls as a shower. The circulating pump 102 may be replaced by a valve when flow can be obtained under gravity. By being expanded in the evaporator 103 in a more or less adiabatic manner, the water partially vaporizes. As the upstream valve 130 is open, the water vapor passes from the evaporator 103 through the pipe 110 to the adsorption/desorption chamber 120 in which the water vapor is adsorbed by the block of zeolite Z. This adsorption reaction consumes the water vapor which appears in the evaporator 103, and this permanently sustains the vaporization of the water in order to compensate for the quantity of vapor adsorbed. This continuous vaporization takes heat from the fluid, that is to say the water present in the evaporator 103, so that a low temperature, for example of between −10 and −30° C., obtains in the evaporator 103. A phase of solid ice is thus obtained in the bottom of the evaporator 103. The temperature and pressure obtaining in the evaporator 103 may be regulated through, on the one hand, the flow rate of vapor leaving through the upstream valve 130 and, on the other hand, the quantity of liquid water introduced from the condenser 101 and the quantity of heat introduced by the heat exchanger 280, which will be described later on. Because of the phase equilibrium, the temperature in the evaporator 103 is lower, the lower the pressure maintained. In particular, it might also be possible to obtain a liquid phase in the evaporator 103 by an appropriate choice of temperature and pressure.

The adsorption/desorption chamber 120 is equipped with a cooling means used to cool the block of zeolite Z during the adsorption reaction, which is exothermal. Thus the temperature in the chamber 120 is kept at below 100° C. To do that, the cooling means is a circuit of heat transfer fluid 140 equipped with a circulating pump 194 and which is in communication with a cold source 108 which may, for example, be water at ambient temperature or alternatively may be the ambient atmosphere.

When the block of zeolite Z has adsorbed a certain quantity of water it needs to be regenerated. To do that, the upstream valve 130 is closed and the downstream valve 150 is opened. Some three-way valves 124 are then switched in order to connect the heat transfer fluid circuit 140 to a hot source 109 receiving heat H from outside. The hot source 109 may be any heat source at a temperature preferably higher than 250° C. Thus, the heat transfer fluid circuit 140 acts as a heating means which heats the block of zeolite Z to, for example, 250° C. At this temperature, the adsorptivity of the zeolite is very low. Desorption is prolonged until almost 90% of the water vapor has been desorbed. As the thermal conductivity of zeolite drops as its water content is reduced, desorbing further water would take a great deal of time, which would slow down the method and thus reduce the temporal efficiency of the machine. Under the effect of the pressure in the chamber 120, the water vapor desorbed is removed from the chamber 120 through the pipe 160, the downstream valve 150 being open. The water vapor escapes into the condenser 101 in which it is condensed and cooled to the intermediate temperature of 80 to 100° C. To do that, the condenser 101 is constantly cooled via a cooling means 126, for example a heat exchanger connected with atmospheric air. A fan 115 is provided to improve the cooling of the condenser 101.

In the evaporator 103, the vaporization reaction of the water is used to extract heat from a coil 125 through which a heat transfer fluid circulates. The coil 125 belongs to a heat exchanger 280 which also comprises a coil 226 arranged in the condenser 201 of the second stage 200 and a coil 270 arranged in the adsorption/desorption chamber 220 of the second stage 200. The heat exchanger 280 also comprises a circulating pump 227 which circulates the heat transfer fluid from the evaporator 103 into the condenser 201 so as to cool the condenser 201 then into the adsorption chamber 220 so as to cool the block of zeolite Z undergoing adsorption. The heat exchanger 380 performs the same function between the second stage 200 and the third stage 300.

In the second stage 200, the refrigerating fluid is, for example, butane $C_4H_{10}$. The intermediate temperature in the condenser 201 is between −10 and −20° C. at a pressure of 1 or 2 atmospheres, the butane therefore being in the liquid form. The temperature obtained in the evaporator 203 is between −60 and −80° C. To regenerate the block of zeolite Z in the adsorption/desorption chamber 220, the temperature is raised to a high temperature of 80° C. To do that, use is made of a heat transfer fluid circuit 240 connected to the hot source 109 and/or some other heating means which will be described with reference to FIG. 2.

Unlike the stage 100, the stage 200 comprises an intermediate cooling reservoir 216 between the pipe 260 which runs from the chamber 220 and the condenser 201. This reservoir 216 is connected to the condenser 201 via a valve 217. The reservoir 216 is lagged when the fluid desorbed is at a temperature below ambient temperature, to prevent an increase in pressure in the reservoir 216. The reservoir 216 is placed in thermal contact with the ambient atmosphere when the fluid desorbed is at a temperature above ambient temperature, so as to obtain a first cooling of the butane in vapor phase after desorption and thus prevent an increase in pressure in the reservoir 216. In the latter instance, the reservoir 216, which is, for example, a conventional steel gas storage cylinder, is positioned outside and a heat exchanger 214 ventilated by a fan 215 is provided.

During regeneration, the block of zeolite Z in the chamber 220 is heated, for example to 80° C. Desorption of the butane causes a rise in pressure in the chamber 220 and therefore causes butane in vapor phase to flow through the pipe 260 to the reservoir 216. When the butane undergoes cooling, this cooling causes butane to be drawn from the chamber 220. In this step, the temperature in the reservoir 216 depends on the conditions under which desorption occurs, that is to say in particular on the pressure in the reservoir 216.

For example, a pressure of 15 bar may be provided. The more the pressure in the reservoir 216 is allowed to rise, the greater the temperature therein will be. From the reservoir 216, the butane in vapor phase is then expanded through the valve 217 in the condenser 216 in order to be cooled further there and liquefied to a pressure close to normal pressure.

The stage 300 is similar to the stage 200. In the third stage 300, the refrigerating fluid is carbon dioxide $CO_2$. The intermediate temperature in the condenser 301 is between −60 and −70° C., the carbon dioxide therefore being in the liquid phase. The low temperature in the evaporator 303 is between −120 and −130° C. To regenerate the block of zeolite Z in the adsorption/desorption chamber 320, the temperature is raised to a high temperature between −10 and −20° C. To do that, use is made of heating means of the same type as were used in the second stage 200, namely a heat transfer fluid circuit 340 connected to the hot source 109 or to a heat exchanger associated with an adsorption/desorption chamber of the previous stage, as will be explained with reference to FIG. 2. During regeneration, in order for cooling at ambient temperature in the reservoir 316 to be effective, the temperature in the reservoir 316 has of course to be above ambient temperature, which assumes that a high enough pressure can be had in the reservoir 316.

Another option is to perform desorption at a lower pressure, so as to obtain a vapor temperature in the reservoir 316 (or 216) which is lower than ambient temperature. In this case, the exchanger 314 (or 214) is omitted. By contrast, in this case the reservoir 316 (or 216) is lagged. This variant may be preferred, according to the refrigerating fluids used, each time the pressure in the reservoir that would make it possible to obtain a temperature above ambient temperature is so high that it gives rise to unacceptable technological constraints.

The evaporator of the last stage, that is to say the evaporator 303 of the third stage 300 in the exemplary embodiment depicted in FIG. 1, is provided with means for using the coldness produced by the multi-stage machine. For that, a final heat exchanger 80 is arranged between the evaporator 303 of the third stage 300 and a chamber 1 containing the product P that is to be cooled. The heat exchanger 80 comprises a heat transfer fluid circuit with a coil 325 in the evaporator 303 in which the heat transfer fluid is cooled and a coil 26 supported in the chamber 1 and in which the heat transfer fluid is heated, cooling the product P. For example, the chamber 1 is a storage tank for storing a liquefied gas that is to be cooled in order to compensate for thermal losses through the walls of the chamber 1. Depending on the application, it is also possible to use coldness taken from the evaporators of the other stages of the machine, by providing corresponding heat exchangers.

Before the machine is started, in the initial state, the refrigerating fluids are stored at ambient temperature in the reservoirs 101, 216 and 316 respectively. The stages 100, 200 and 300 are started in succession.

Figure 2:
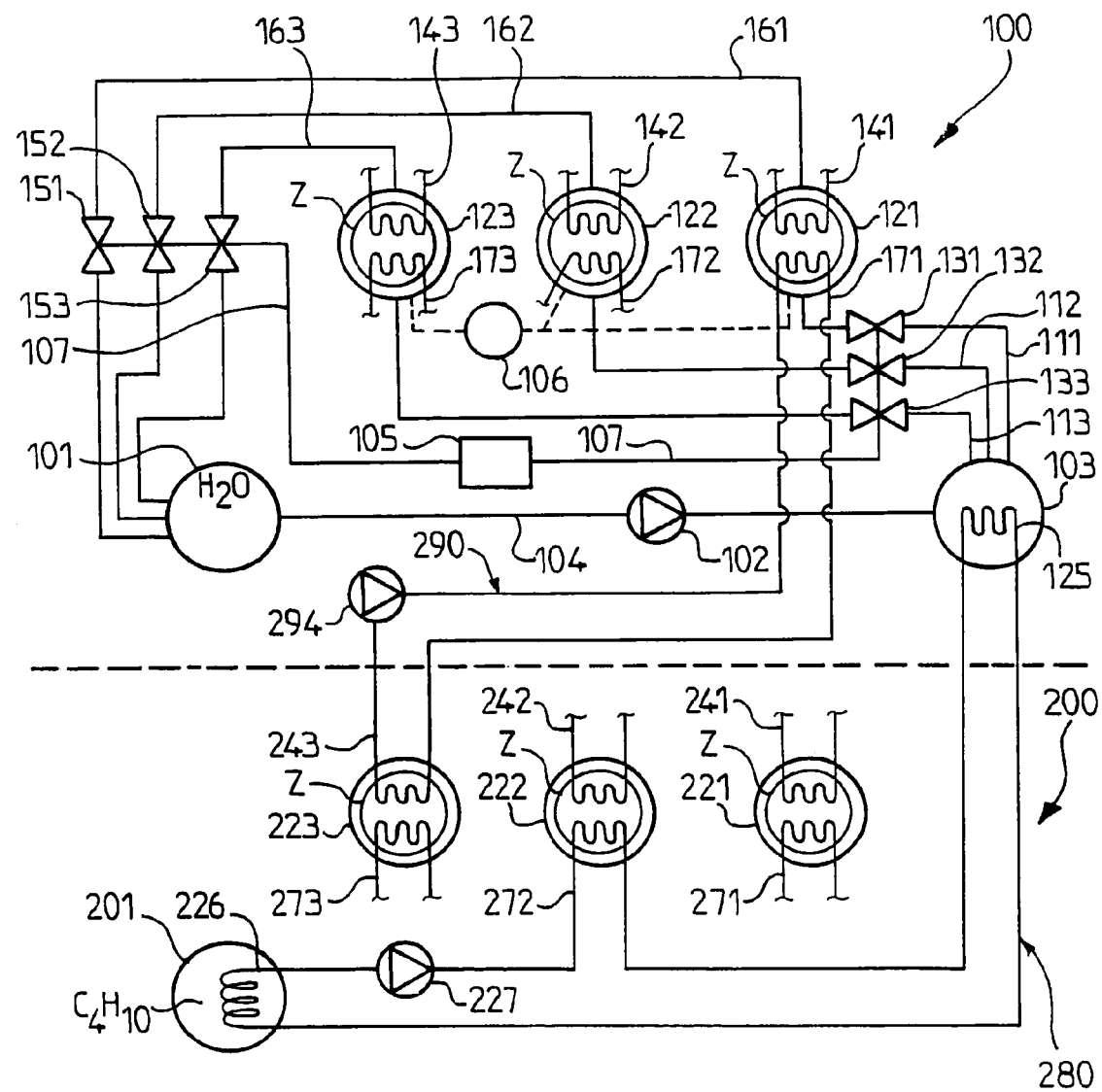
FIG. 2 depicts, in greater detail, the first stage and part of the second stage of the machine according to a second embodiment of the invention.

As depicted in FIG. 1, the multi-stage machine cannot provide cooling during the phase in which the blocks of zeolite Z are being regenerated. To remedy this disadvantage, with reference to FIG. 2, a second embodiment of the machine is now described in which embodiment at least two, and preferably three, adsorption/desorption chambers are provided in each stage. In FIG. 2, elements identical or similar to those of the first embodiment are denoted by the same reference numerals.

In FIG. 2, in the detailed depiction of the first stage 100, the adsorption/desorption chamber 120 and the corresponding upstream and downstream valves are replaced by three adsorption/desorption chambers 121, 122 and 123 which are connected respectively to the condenser 101 via pipes 161 to 163 equipped with downstream bars 151 to 153. The chambers 121 to 123 are also connected to the evaporator 103 via pipes 111 to 113 equipped with upstream valves 131 to 133. The valves 131 to 133 and 151 to 153 are electrically-operated valves controlled by a control unit 105 via control lines 107. The control unit 105 is programmed to perform a cycle of concurrent operations in which, simultaneously:

one chamber, for example 121, is undergoing adsorption, the associated upstream valve being open and the associated downstream valve being closed, another chamber, for example 123, is undergoing regeneration, the upstream valve being closed and the downstream valve being open, and the third chamber, for example 122, is undergoing cooling, the upstream valve and the downstream valve being closed.

The valves are thus periodically switched in such a way that each chamber performs the adsorption step, the regeneration step and the post-regeneration cooling step in succession. The steps are not necessarily of the same duration, which means that the changes in step do not necessarily occur simultaneously in all the chambers of one stage. In order to perform the cycle of concurrent operations, it is preferable for the switching between chambers to be performed synchronously in all the stages, for reasons of simplicity.

If just two chambers are provided, the regeneration step and the cooling step in respect of one chamber are carried out during the adsorption step of the other chamber. In this way, at any moment, there is at least one chamber undergoing adsorption in each stage.

Each chamber 121 to 123 is equipped with a cooling coil 171 to 173 connected to a cold source and with a heating coil 141 to 143 connected to a hot source. By circulating heat transfer fluids, the block of zeolite Z is thus cooled during the adsorption step and during the post-regeneration cooling step, and the block of zeolite is also cooled during the regeneration step.

As a variant, as depicted in FIG. 1, with the numeral 140, a single heat transfer fluid circuit may be used as a cooling means and as a heating means by connecting it selectively either to a hot source or to a cold source. Because of the thermal inertia to which this gives rise, such a setup is, however, less advantageous.

A vacuum pump 106 is connected to each adsorption/desorption chamber 121 to 123 in order to sustain the vacuum. The vacuum pump 106 serves to compensate for lacks of leaktightness of the refrigerating fluid circuit and to draw out uncondensable bodies that were initially dissolved in the water, for example oxygen, and which would carry the risk of remaining in the adsorption chamber because they cannot be adsorbed by the zeolite. After one or two cooling cycles, the water will be free of such incondensables.

The heat exchanger 280 has been depicted in FIG. 2 as being connected to the cooling coil 272 of the adsorption/desorption chamber 22. However, it is each of the adsorption chambers 221 to 223 that needs to be cooled during the adsorption step and during the post-regeneration cooling step. To achieve that, a separate heat exchanger may be provided for each of the adsorption/desorption chambers 221 to 223 so as to exchange heat with the evaporator 103. As a variant, the heat exchanger 280 will be equipped with multi-way valves so that the cooling heat transfer fluid can be circulated selectively through one or several cooling coils 272 to 273. According to yet another variant, it is possible to provide at least two separate heat exchangers for exchanging heat, on the one hand, between the evaporator 103 and the condenser 201 and, on the other hand, between the evaporator 103 and the adsorption chambers 221 to 223.

By way of a means of heating the blocks of zeolite Z in the second stage 200 a heat exchanger 290 has been depicted which allows a heat transfer fluid to be circulated through a cooling coil 171 of the chamber 121 of the first stage which is undergoing the adsorption step and in which the heat transfer fluid is heated to 80 to 100° C., then through the heating coil 243 of the adsorption/desorption chamber 223 which is undergoing the regeneration step. Thus, each adsorption/desorption chamber of the second stage can be heated to 80° C. for its regeneration. Once again, it is each of the chambers 221 to 223 which needs, when performing its own regeneration step, to exchange heat with the chamber 121 or 122 or 123 simultaneously undergoing its own adsorption step. For that, several heat exchangers similar to the exchanger 290 may be provided, or alternatively multiway valves may be provided, these valves being switchable so that one or other of the cooling coils 171 to 173 can be connected selectively to one or other of the heating coils 241 to 243. The heat transfer fluid is circulated through the heat exchanger 290 by means of a pump 294.

As a variant or as a supplement it is possible to provide a heat exchanger between the adsorption/desorption chambers 221 to 223 of the stage 200 and the condenser 101 of the stage 100 so as to use the heat of condensation of the water to regenerate the zeolite in the stage 200. However, it is necessary to have good control over the condensation temperature in the condenser 101 in order to be able to proceed in this way.

Heat exchangers similar to the exchangers 280 and 290 depicted in FIG. 2 are connected between all the successive stages of the machine, such that each stage produces the coldness needed to condense the refrigerating fluid in the next stage, to cool the zeolite in the adsorption phase in the next stage, and produces the heat required to perform desorption of the refrigerant in the next stage, or at least some of this heat. Thus, in a preferred embodiment, only the stage 100 requires an external supply of heat H by means of the hot source 109. However, it is also possible to use external heat H for regeneration in all the stages.

In FIG. 1, the machine comprises three stages mounted in cascade. However, it is possible to provide fewer or more stages with, in each stage, a high temperature, an intermediate temperature and a low temperature chosen to be below the corresponding temperature in the previous stage. For example, it is possible to provide a fourth stage using ethylene as a refrigerating fluid, a fifth stage using methane as a refrigerating fluid, a sixth stage using nitrogen or argon as a refrigerating fluid, and a seventh stage using neon as a refrigerating fluid. The low temperature in the last stage could then be close to 10 K.

Table 1 gives thermodynamic properties of a certain number of bodies that can be used as refrigerating fluids in the multi-stage cooling machine. The boiling point of each is given for several pressure values in order to illustrate the range of temperatures that can be obtained in the evaporator for each stage, according to the choice of refrigerating fluid. In the first stage, it is also possible to use a mixture of water and glycol in order to obtain a higher melting point. Thus, it is possible to avoid ice forming in the evaporator 103. The zeolite Z in the chambers 121 to 123 will then be chosen in a size that prevents any adsorption of the glycol, so that this glycol remains in the evaporator 103.

Zeolite is available in numerous forms that differ from one another in terms of their crystal structure or in terms of the pore size. In general, for each cycle, the form of zeolite best suited to the refrigerating fluid used is chosen.

In one particular embodiment, zeolite that has a particular structure allowing adsorption and desorption reactions to be accelerated is chosen. Such a structure is described in EP-A-470 886. Zeolite in granular form, with a diameter of 3 mm for example, is deposited by immersion on a metal component on which projections have been fashioned to delimit interstitial spaces. The zeolite fills these spaces and is fixed by sintering. With such a high-speed structure, one stage of the machine, for example the stage 100, can be run with just one adsorption/desorption chamber and with the adsorption and desorption steps taking place in quick succession, for example once a minute.

The cooling machine described hereinabove has numerous applications. For example, it may be used as a cooling unit associated with a tank for transporting liquefied gas in a methane tanker. For that the coil 26 of the final heat exchanger 80 will be suspended in the tank. In order to produce such an arrangement, reference will be made to application FR 2 785 034 A1. The temperature in the final heat exchanger 80 must be below or equal to −164° C. in order to liquefy methane at normal pressure. To do that, it is of course necessary to provide more stages than have been depicted in FIG. 1, for example adding a stage using ethylene as a refrigerating fluid and a stage using methane as a refrigerating fluid. For this type of application, the use of oxygen as a refrigerating fluid is avoided, because of the risks of explosion in the event of leakage.

Figure 3:
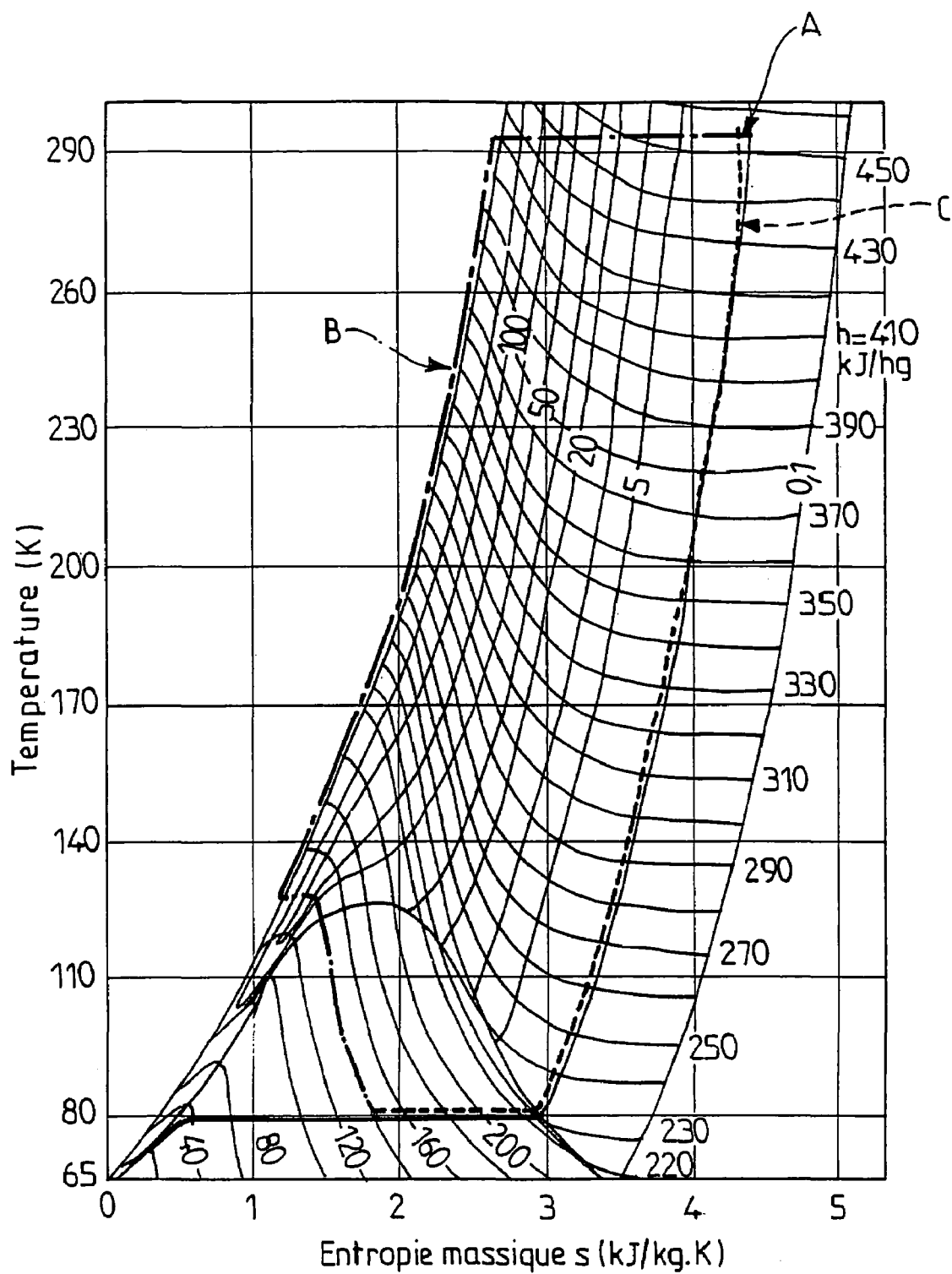
FIG. 3 is a thermodynamic diagram for nitrogen $N_2$.

The multi-stage machine may also be used for carrying out isobaric cooling of a gaseous body that needs to be liquefied in a liquefaction plant. To do that, the chamber 1 is used as a gas liquefaction chamber. The multi-stage machine may be applied to the liquefaction of air or its constituent components, including rare gases. The curve C in FIG. 3 represents the thermodynamic path taken by the nitrogen in such a liquefaction method, from the initial state represented by the point A.

An analogous path may be plotted on the temperature-entropy thermodynamic diagram for another gas, particularly methane. Such diagrams are available in the reference work "l' encyclopédie des gaz [encyclopedia of gases]", ISBN 0-444-41492-4 (1976-2002). For example, it is possible to obtain a liquefied methane flow rate of about 20 kg/min with 1 t of zeolite in each adsorption/desorption chamber.

The heat transfer fluid circuits described hereinabove constitute merely one illustrative example of a heat exchanger. Numerous other types of exchanger may be used to implement the method according to the invention, particularly without using an intermediate heat transfer fluid.

Another embodiment of a refrigerating machine involving stages is now described with reference to FIG. 6. Elements identical or analogous to those of the first embodiment bear the same reference number increased by 300.

Figure 7:
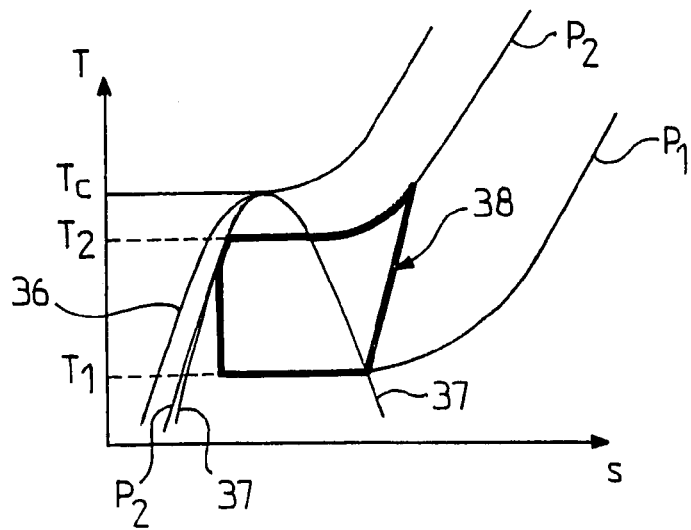
FIG. 7 depicts a thermodynamic cycle performed by the refrigerating fluid in each stage of the refrigerating machine of FIG. 6.

In each of the stages, a refrigerating fluid performs a thermodynamic cycle the principle of which is represented in FIG. 7, which is a general diagram that can be applied to various fluids.

In FIG. 7, the abscissa axis represents the specific entropy s and the ordinates axis represents the temperature T. The line 37 represents the liquid/vapor phase change curve and the line 36 represent the critical isobaric curve for the fluid.

Two isobaric curves corresponding to two pressures $P_1 < P_2$ chosen between the triple point and the critical pressure for the fluid have also been depicted. The cycle is a closed cycle represented by the curve 38.

The fluid in liquid phase is evaporated isobarically at the pressure $P_1$ and the temperature $T_1$ by placing it in communication with a zeolite adsorbent that is kept at an adsorption temperature $T_{ads}$ for adsorbing the vapor phase. After adsorption, the zeolite is heated to a desorption temperature $T_{des} < T_{ads}$. The desorbed vapor undergoes isobaric compression to the pressure $P_2$. The fluid in the vapor phase is condensed isobarically at the pressure $P_2$ and the temperature $T_2$. Finally, the pressure of the liquid phase is reduced sharply from $P_2$ to $P_1$, by means of a pressure drop, thus vaporizing some of the fluid.

In the successive stages, the fluids and the pressures are chosen so that the evaporation of the fluid in a stage of rank n takes the heat necessary for condensing the fluid from the next stage of rank n+1. The operating condition is therefore $T_1(n)<T_2(n+1)$.

Figure 5:
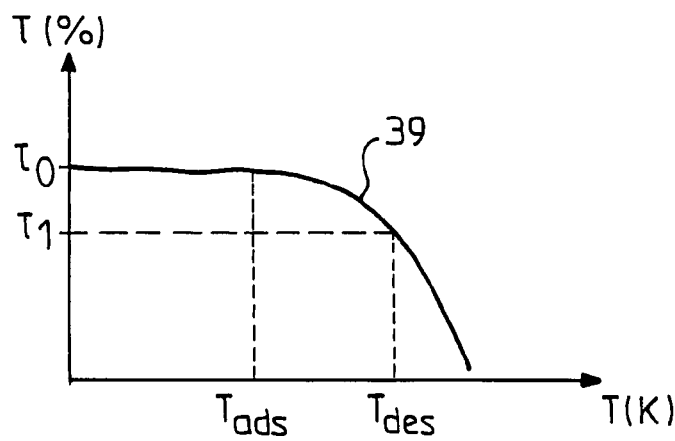
FIG. 5 depicts a typical example of the adsorption curve for a zeolite adsorbent as a function of temperature.

FIG. 5 depicts an example of an adsorption curve 39 showing the rate of absorption τ (as a percentage by mass of fluid adsorbed with respect to the quantity of adsorbent) as a function of temperature T. Below the adsorption temperature $T_{ads}$, the rate is more or less equal to the saturation rate $\tau_0$. To reduce the adsorption rate to a level $\tau_1<\tau_0$, the temperature of the adsorbent has to be raised to a corresponding desorption temperature $T_{des}$. In practice, the curve 39 is dependent upon the fluid/adsorbent pair. In all the stages, the purpose of the adsorption reactors is to provide two vapor pressure levels corresponding to two different temperature levels.

The three stages 400, 500 and 600, the structures and functioning of which are similar, are described together. In the condenser 401 (or 501 or 601) the fluid is condensed at the high pressure of the cycle Pi through the extraction of the heat of condensation. The condensed fluid flows under gravity through a pipe 404 (or 504 or 604) to the evaporator 403 (or 503 or 603) undergoing a pressure drop to the low pressure of the cycle $P_2$. Flow through the evaporator occurs naturally on each occasion. All that is required is for its flow rate to be regulated in order to tailor the adsorptivities and evaporation capacities to suit the temperature and pressure conditions desired in the evaporator. The evaporator is lagged.

The condenser 501 (or 601) of the next stage in this instance is produced in the form of hollow plates of a heat exchanger which are arranged in the evaporator 403 (or 503) and over which the liquid introduced into the evaporator is made to trickle in order simultaneously to evaporate this liquid and condense the refrigerating fluid in the condenser. FIG. 9 schematically depicts such a heat exchanger plate 25 on which a film of liquid 27 is undergoing evaporation.

In order to improve the evaporation dynamics, it is also possible to diffuse the liquid introduced into the evaporator using a jet break-up device 435 (or 535 or 635) arranged at the end of the pipe 404 (or 504 or 604). Devices such as this in several types, for example involving a single orifice (FIG. 10), involving multiple orifices (FIG. 11), or involving a helix on a jet (FIG. 12), are known, these having been developed, for example, for supplying fuel to burners. In this instance, they need to be heated in order to prevent them from becoming plugged.

A pipe 410 (or 510 or 610) connects the evaporator to three reactors 421-423 (or 521-523 or 621-623) containing a zeolite absorbent. Shut-off valves, not depicted (for example nonreturn valves), allow the reactors to be isolated individually from the evaporator and from the condenser, so that, at any moment, one of the reactors at least is connected to the evaporator and cooled to an appropriate adsorption temperature $T_{ads}$ so that vapor formed in the evaporator can be absorbed (exothermal reaction), and one of the reactors at least is connected to the condenser and heated to a suitable desorption temperature $T_{des}>T_{ads}$ so as to release the vapor (endothermal reaction) to the condenser at the high pressure of the cycle.

A high pressure $P_1$ that is not very high, for example lower than 5 bar absolute, or even lower than 3 bar absolute, is preferably chosen, so as to limit the wall thickness and thus the weight and cost of the machine.

If the condenser is likened to a spherical jacket of radius R, then the thickness e can actually be expressed as a function of the pressure difference ΔP between the inside and outside, as follows:

$$e = \frac{\Delta P R}{2\sigma_{adm}}$$

For a cylindrical jacket of radius R, the factor of 2 is omitted. Considering a spherical chamber of radius 3 m, for a maximum permissible stress $\sigma_{adm}=240$ MPa, without a factor of safety, the thickness is:

| ΔP (bar) | 0.5 | 1 | 1.5 | 2 | 3 | 5 | 10 | 15 | 20 |
|---|---|---|---|---|---|---|---|---|---|
| e (mm) | 0.3 | 0.6 | 0.9 | 1.3 | 1.9 | 3.1 | 6.3 | 9.4 | 12.5 |
| M (kg) | 276 | 551 | 827 | 1103 | 1654 | 2757 | 5513 | 8270 | 11027 |

For this type of installation, a factor of safety of 5 seems the most probable. The mass will increase by the same factor.

EXAMPLE 1

Figure 6:
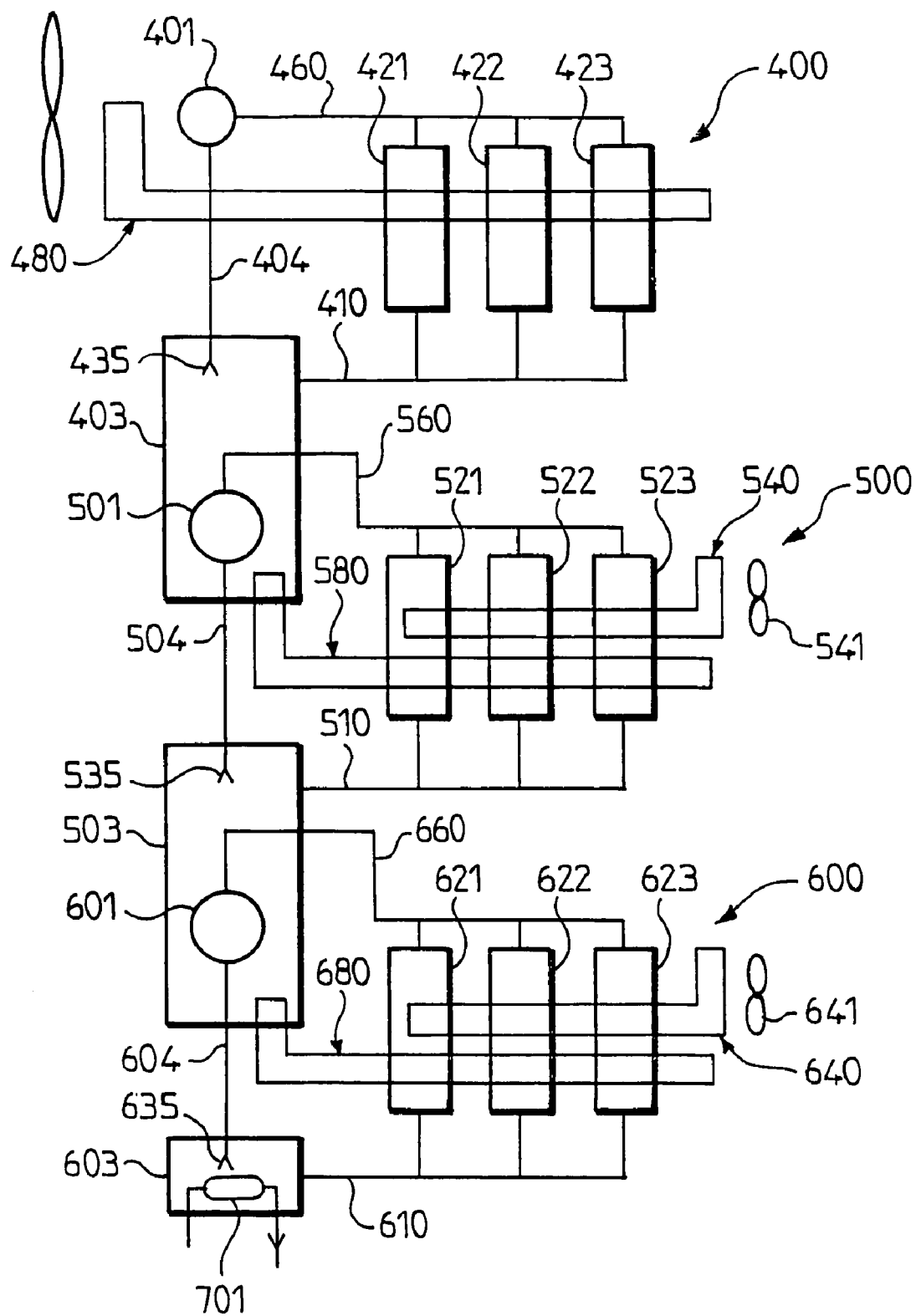
FIG. 6 depicts a three-stage refrigerating machine according to a third embodiment of the invention.

A machine having up to 5 stages with the structure depicted in FIG. 6 was produced. Table 2 gives, for each stage, a list of bodies that can be used as refrigerating fluid, the high temperature $T_2$ attained in the condenser and the low temperature $T_1$ attained in the evaporator.

The fluids are classified according to their equilibrium temperatures at pressures of 1 bar and 0.5 kPa.

EXAMPLE 2

A three-stage cooling machine with the structure depicted in FIG. 6 was produced. The parameters for each stage are given in table 3.

FIG. 8 provides greater detail about the cycles of the three fluids, with a representation similar to that of FIG. 7.

This machine can be used for cooling a product P to −150° C. approximately, for example by circulating this product through a heat exchanger 701 housed in the evaporator 603 of the last stage. To cool the adsorption reactors 421-423 during the adsorption phase a heat exchanger 480 is provided that allows the heat to be removed to the atmospheric air or to a body of water at ambient temperature. To regenerate these reactors, a heat source at 250° C. is provided, as described above with reference to FIG. 1.

In the butane and ethane stages, the reactors are cooled in the adsorption phase by a heat exchanger 580 (or 680) for removing heat to the evaporator 403 (or 503) of the previous stage. Although the heat exchangers 480, 580 and 680 have been depicted schematically, they comprise the valves and configurations needed to allow each of reactors to be cooled selectively.

In the butane and ethane stages there is also provided a heat exchanger 540 (or 640) designed to exchange heat between the atmospheric air, the convection of which is preferably forced by a fan 541 (or 641), and the zeolite adsorbent with a view to regenerating it at ambient temperature or a temperature slightly higher than ambient temperature. If the regeneration temperature is higher than the ambient temperature, then in addition heat may be exchanged with the condenser 401 of the water stage in order to provide the additional heat to the zeolite. Here again, the valves and configurations that allow each of the reactors 521-523 (or 621-623) to be heated selectively are provided. In this way, the supply of external energy to the machine is only to the first stage, when the reactors 421-423 are being regenerated.

EXAMPLE 3

A machine for liquefying methane at normal pressure comprises four stages the first three of which are similar to Example 2. Table 4 gives the parameters for each stage. A stage in which the fluid is methane is added, in accordance with the structure set out in FIG. 6.

On the basis of an adsorption rate of 10%, a cycle time of 1 hour for each stage, an adsorption heat of one and a half times the latent heat, and three reactors per stage, the following adsorption and desorption temperatures may be anticipated:

| Fluid | Water | Butane | Ethane | Methane |
|---|---|---|---|---|
| $T_{ads}$ | 80° C. | −30° C. | −30° C. | −30° C. |
| $T_{des}$ | 180° C. | 70° C. | 70° C. | 70° C. |

In this configuration, the exchangers 580 and 680 can be modified in such a way as to cool the reactors undergoing adsorption of the lower stages by using the coldness produced in the evaporator 403 of the water stage. If necessary, for that use may be made of the coldness produced in the evaporator 503 of the butane stage.

In addition, heat exchangers, not depicted, for regenerating the reactors 521-523, 621-623, etc. of the lower stages using the heat of adsorption produced in the reactors 421-423 of the water stage, possibly combined with the heat of condensation of the water which is released in the condenser 401, are provided. Thus, only the reactors of the water stage consume external energy for their regeneration, for example in the form of heat at 250° C.

EXAMPLE 4

The machine of Example 3 is sized so that it forms a plant for reliquefying the gas of evaporation loaded on board a methane tanker.

For a cargo volume of 125000 m³ of liquid methane and an evaporation rate of 0.15%/d, the useful refrigerating power required is estimated at about 580 kW. For that, the following orders of magnitude are anticipated:

| Fluid | Water | Butane | Ethane | Methane |
|---|---|---|---|---|
| Mass of adsorbent | 13 t | 18 t | 15 t | 14 t |
| Heat released | | 1.1 MJ | 1.1 MJ | 1.1 MJ |

The total mass of the plant is of the order of 200 t and its daily consumption is 2.7 t/d of methane. These masses are proportional to the cycle time.

EXAMPLE 5

The machine of Example 3 is sized to load a methane tanker with a liquefied gas containing a high methane content in 24 h starting out from gases at 30° C. for a cargo volume of 125000 m³. The useful refrigerating power required is estimated at 630 MW. For that, the following masses of adsorbent are anticipated:

| Fluid | Water | Butane | Ethane | Methane |
|---|---|---|---|---|
| Mass of adsorbent | 14 157 t | 19 602 t | 16 335 t | 15 246 t |

The total mass of the plant is of the order of 217800 t and its daily consumption is 2940 t/d of methane.

Figure 4:
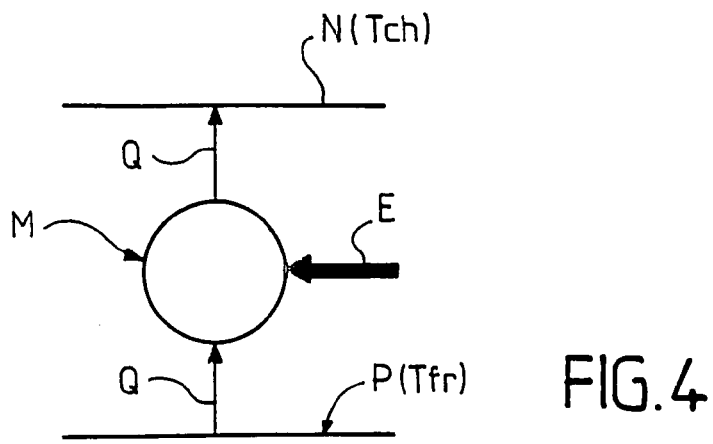
FIG. 4 is a general operating diagram for a refrigerating machine.

FIG. 4 is a general operating diagram for a refrigerating machine M. In operation, the refrigerating machine M transfers heat Q from a cold source to a hot source N temperature $T_{ch}$ of which is higher than that of the cold source $T_{fr}$. To do that, the machine M consumes energy E. The efficiency of the machine is defined by the ratio Q/E. In the embodiments described hereinabove, the cold source consists of a product P that is to be cooled and the hot source preferably consists of the ambient atmosphere or the sea.

One way of favorably affecting this efficiency is to limit the compression work by limiting the high pressure of the cycles, that is to say the condensation pressure, to a value lower than a few bar, such as in Examples 2 and 3. In addition, given the pressure difference, limited to about 1 bar, in each stage, the vapor obtained during regeneration of the zeolite is slightly superheated and does not require any supercooling, because isochoric compression by 1 bar produces a heating effect of just 60° C. approximately.

In applications involving a high refrigeration power it is preferable to use fluids with a high latent heat of vaporization/condensation, so as to limit the refrigerating fluid flow rates and the mass of the adsorbents. Table 5 gives physical properties of various bodies that can be used as refrigerating fluids in the methods according to the invention: critical pressure Pc, critical temperature Tc, triple point temperature and latent heat L, which is a parameter used for classifying the fluids in this table.

Although the invention has been described in conjunction with several specific embodiments, it is quite obvious that it is not in any way restricted thereto and that it comprises all technical equivalents of the means described and combinations thereof where these fall within the scope of the invention.

TABLE 1

Boiling points (° C.) of several bodies that can be used as refrigerating fluids at various pressures

| Body | P = 1 Torr (1.33 × 10² Pa) | P = 10 Torr (1.33 × 10³ Pa) | P = 1 atm (1.013 × 10⁵ Pa) | P = 2 atm (2.026 × 10⁵ Pa) |
|---|---|---|---|---|
| Ammonia NH₃ | −109 | −92 | −33 | −18.7 |
| Butane C₄H₁₀ | −101 | −78 | −0.5 | −18.8 |

TABLE 1-continued

Boiling points (° C.) of several bodies that can be used as refrigerating fluids at various pressures

| Body | P = 1 Torr (1.33 × 10² Pa) | P = 10 Torr (1.33 × 10³ Pa) | P = 1 atm (1.013 × 10⁵ Pa) | P = 2 atm (2.026 × 10⁵ Pa) |
|---|---|---|---|---|
| Methane CH$_4$ | −205 | −195 | −164 | −152 |
| Nitrogen N$_2$ | −226 | −219 | −196 | −189 |
| Carbon dioxide CO$_2$ | −134 | −119 | −78 | −69 |
| Propane C$_3$H$_8$ | −129 | −108 | −42 | −25 |
| Neon Ne | −257 | −254 | −246 | −243 |
| Xenon Xe | −168 | | −108 | |
| Argon Ar | −218 | −210 | −185 | −179 |
| Acetylene C$_2$H$_2$ | −143 | −128 | −84 | −71 |
| Ethylene C$_2$H$_4$ | −168 | −153 | −104 | |
| Krypton Kr | −199 | −187 | −152 | |
| Ethane C$_2$H$_6$ | −183 | −159 | −88 | −75 |

TABLE 2

| Stage | Fluid | T$_2$ | T$_1$ |
|---|---|---|---|
| 1$^{st}$ | Water, alcohols | ambient | Down to −40° C. |
| 2$^{nd}$ | Butane, butadiene, propadiene, propane | −20° C. | −80° C. |
| 3$^{rd}$ | Ethane, CO$_2$ Nitrous oxide | −80° C. | −150° C. |
| 4$^{th}$ | Methane, krypton | −150° C. | −200° C. |
| 5$^{th}$ | Neon, oxygen, helium, nitrogen, argon, CO | −200° C. | −260° C. |

TABLE 3

| Stage | Fluid | P$_1$ | T$_1$ | P$_2$ | T$_2$ |
|---|---|---|---|---|---|
| 400 | Water | 0.1032 kPa | −20° C. | 7.3 kPa | 40° C. |
| 500 | Butane | 1 kPa | −81° C. | 45 kPa | −20° C. |
| 600 | Ethane | 0.1 kPa | −153° C. | 150 kPa | −81° C. |

TABLE 4

| Fluid | Water | n-butane | Ethane | Methane |
|---|---|---|---|---|
| P$_2$(bar) | 0.8 | 1 | 1 | 3 |
| T$_2$(° C.) | 80 | −5 | −88 | −148 |
| P$_1$(kPa) | 0.5 | 0.5 | 0.5 | 20 |
| T$_1$(° C.) | −30 | −88 | −155 | −182 |

TABLE 5

| | Pc (bar) | Tc (° C.) | Triple (° C.) | L (kJ/kg) |
|---|---|---|---|---|
| Water | 221 | 376 | 0 | 2500 |
| CO$_2$ | 74 | 31 | −56.6 | 571 |
| Methane | 46 | −82.2 | −182.5 | 510 |
| Ethane | 49 | 32.2 | −183.3 | 489 |
| Ethylene | 50 | 9.5 | −169 | 482 |
| Hydrogen | 13 | −240 | −259.3 | 454.3 |

TABLE 5-continued

| | Pc (bar) | Tc (° C.) | Triple (° C.) | L (kJ/kg) |
|---|---|---|---|---|
| Propane | 42.5 | 96.6 | −187.7 | 425.3 |
| Butane | 38 | 152 | −125 | 386 |
| Nitrogen | 34 | −147 | −210 | 198 |
| Krypton | 55 | −63.8 | −157 | 107.8 |
| Xenon | 58.4 | 16.5 | −111.8 | 96.29 |
| Neon | 27.56 | −228.8 | −249 | 88.7 |
| Helium | 2.2 | −268 | −272.2 | 20 |

The invention claimed is:

1. A method for cooling a product (P) comprising N ordered adsorption/desorption cycles (100, 200, 300, 400, 500, 600) performed under vacuum, N being an integer greater than 1, each cycle comprising the steps consisting in:
extracting heat from a refrigerating fluid in the vapor phase in a condenser (101, 201, 301, 401, 501, 601) at a first pressure (P$_2$) below the critical pressure of said fluid for condensing said refrigerating fluid,
introducing said refrigerating fluid in the liquid phase into an evaporator (103, 203, 303, 403, 503, 603) at a second pressure (P$_1$) lower than the first pressure in order to vaporize some of said refrigerating fluid and cool the rest of said refrigerating fluid to a vaporization temperature (T$_1$) of said refrigerating fluid at said second pressure, said vaporization temperature decreasing from one cycle to the next, said first and second pressures being chosen in each cycle so that said vaporization temperature (T$_1$) in one cycle is each time lower than the condensation temperature (T$_2$) of the refrigeration fluid in the next cycle at the first pressure of said next cycle,
supplying heat to the liquid fraction of said refrigerating fluid at said second pressure in said evaporator in order to evaporate said refrigerating fluid,
adsorbing said refrigerating fluid in the vapor phase in at least one adsorption/desorption chamber (120, 220, 320, 421-423, 521-523, 621-623) connected to said evaporator and containing a zeolite adsorbent (Z)
once a quantity of said refrigerating fluid has been adsorbed into said zeolite adsorbent, regenerating said zeolite adsorbent by heating in order to desorb said quantity of refrigerating fluid in the vapor phase,
returning said quantity of refrigerating fluid in the vapor phase to said condenser,
said method further comprising the steps consisting in:
performing N-1 heat exchanges, each performed between the refrigerating fluid in the evaporator (103, 203, 403, 503) of one cycle and the refrigerating fluid in the condenser (201, 301, 501, 601) of the next cycle in the order of the cycles in order thus to supply said heat to said evaporator and extract said heat in said condenser,
and cooling said product by exchange of heat with the refrigerating fluid at least in the evaporator (303, 603) of the last cycle.

2. The method as claimed in claim 1, characterized in that said extraction of heat in the condenser of the first cycle is performed by exchange of heat with an environmental fluid at ambient temperature.

3. The method as claimed in claim 1, characterized in that, in at least one of said cycles, the heating of said zeolite adsorbent (Z) to be regenerated is performed by exchange of heat with an environmental fluid at ambient temperature.

4. The method as claimed in claim 1, characterized in that it comprises the step that consists in performing at least one exchange of heat, preferably at least N-1 exchanges of heat, each heat exchange being between said zeolite adsorbent (Z) undergoing adsorption in an adsorption/desorption chamber (121) of one cycle and said zeolite adsorbent (Z) undergoing regeneration in an adsorption/desorption chamber (223) of the next cycle.

5. The method as claimed claim 1, characterized in that it comprises the step that consists in performing at least one exchange of heat, preferably N-1 exchanges of heat, each heat exchange being between the refrigerating fluid in the evaporator (103, 203) of one cycle and said zeolite adsorbent (Z) in the adsorption/desorption chamber (220, 320) of the next cycle undergoing adsorption, in order to cool said zeolite adsorbent.

6. The method as claimed claim 1, characterized in that, in each cycle, there are at least two adsorption/desorption chambers, so that said adsorption of the refrigerating fluid can be performed in one (121, 221) of said adsorption/desorption chambers while at the same time said regeneration of the zeolite adsorbent (Z) is being performed in another (123, 223) of said adsorption/desorption chambers.

7. The method as claimed in claim 6, characterized in that, in each cycle, there are at least three adsorption/desorption chambers so that a step of cooling the zeolite adsorbent (Z) after regeneration can also be performed at the same time in yet another (122, 222) of said adsorption/desorption chambers.

8. The method as claimed in claim 7, characterized in that it comprises the step that consists in performing at least one exchange of heat, preferably N-1 exchanges of heat, each heat exchange being between the refrigerating fluid in the evaporator (103) of one cycle and said zeolite adsorbent (Z) in the adsorption/desorption chamber (222) of the next cycle undergoing post-regeneration cooling.

9. The method as claimed in claim 1, characterized by the step that consists, in at least one of said cycles, preferably in each of said cycles, in cooling said quantity of refrigerating fluid in the vapor phase by exchange of heat with a source at ambient temperature before said quantity of refrigerating fluid is reintroduced into the condenser.

10. The method as claimed in claim 1, characterized in that, in at least one of said cycles, the first pressure ($P_2$) in said condenser (101, 201, 301, 401, 501, 601) is lower than 3 bar, preferably close to normal pressure.

11. The method as claimed in claim 1, characterized in that, in at least one of said cycles, the maximum pressure is lower than 5 bar, preferably close to normal pressure.

12. The method as claimed in claim 1, characterized in that, in at least one of said cycles, said refrigerating fluid in the liquid phase is introduced in atomized form into the evaporator (103, 203, 303, 403, 503, 603).

13. The method as claimed in claim 1, characterized in that the partial pressure of air in each cycle is less than about 1 kPa, preferably less than about 0.1 kPa.

14. The method as claimed in claim 1, characterized in that the refrigerating fluid in the first cycle (100, 400) is chosen from the group consisting of water, alcohols and mixtures thereof.

15. The method as claimed in claim 14, characterized in that the refrigerating fluid in the second cycle (200, 500) is chosen from the group consisting of butane, butadiene, propadiene, propane and mixtures thereof.

16. The method as claimed in claim 15, characterized in that it comprises a third cycle (300, 600) with a refrigerating fluid chosen from the group consisting of ethane, carbon dioxide, nitrous oxide and mixtures thereof.

17. The method as claimed in claim 16, characterized in that it comprises a fourth cycle with a refrigerating fluid chosen from the group consisting of methane, krypton and mixtures thereof.

18. The method as claimed in claim 17, characterized in that it comprises a fifth cycle with a refrigerating fluid chosen from the group consisting of neon, oxygen, helium, nitrogen, argon, carbon monoxide and mixtures thereof.

19. The method as claimed in claim 1, characterized in that, in at least one of said cycles, said refrigerating fluid has a latent heat of vaporization higher than 300 kJ/kg, preferably greater than or equal to about 450 kJ/kg.

20. The method as claimed in claim 1, characterized in that, in at least one of said cycles, the vaporization temperature ($T_1$) in the evaporator is above the triple point of said refrigerating fluid.

21. The method as claimed in claim 1, characterized in that said product (P) is initially in the vapor phase and in that said product is cooled until it liquefies.

22. The method as claimed in claim 21, characterized in that said product (P) is a gas used as a fuel or as a polymerizable raw material.

23. The method as claimed in claim 1, characterized in that said product (P) is a gas for use as a raw material that is cooled or liquefied to between −80C. and −220C.

24. A device for implementing the method as claimed in claim 1, comprising N ordered cooling stages (100, 200, 300, 400, 500, 600) performed under vacuum, N being an integer greater than 1, each stage comprising:
- a condenser (101, 201, 301, 401, 501, 601) which contains a refrigerating fluid in a liquid phase,
- an evaporator (103, 203, 303, 403, 503, 603) connected to said condenser by a pipe (104, 204, 304, 404, 504, 604)
- at least one adsorption/desorption chamber (120, 220, 320, 421-423, 521-523, 621-623) containing a zeolite adsorbent (Z) and connected to said evaporator via an upstream valve (130, 230, 330)
- a pipe (160, 260, 360, 460, 560, 660) equipped with a downstream valve (150, 250, 350) for returning said refrigerating fluid from said adsorption/desorption chamber to said condenser,
- a heating means (140, 240, 243, 340) in said or each adsorption/desorption chamber able to heat said zeolite adsorbent to a regeneration temperature, said device comprising N-1 heat exchangers (280, 380, 501, 601) each arranged in such a way as to exchange heat between the refrigerating fluid in the evaporator (103, 203, 403, 503) of one stage and the refrigerating fluid in the condenser (201, 301, 501, 601) of the next stage in the order of the cycles in order to cool this fluid, and a final heat exchanger (80, 701) arranged in such a way as to exchange heat between a product (P) that is to be cooled and the refrigerating fluid in at least the evaporator of the last stage (303, 603).

25. The device as claimed in claim 24, characterized in that it comprises a heat exchanger (126, 480) arranged in such a way as to exchange heat between the refrigerating fluid in the condenser (101, 401) of the first stage and an environmental fluid at ambient temperature.

26. The device as claimed in claim 24, characterized in that it comprises, by way of heating means for heating at least one of said adsorption/desorption chambers (521-523, 621-623), a heat exchanger (540, 640) arranged in such a way as to exchange heat between said zeolite adsorbent (Z) undergoing adsorption and an environmental fluid at ambient temperature.

27. The device as claimed in claim 24, characterized in that it comprises, in at least one of said stages, a liquid-atomization device (435, 535, 635) arranged in such a way as to atomize the refrigerating fluid in the liquid phase as it is introduced into the evaporator (403, 503, 603).

28. The device as claimed in claim 24, characterized in that, in at least one of said stages, a cooling chamber (216, 316) for cooling the refrigerating fluid is arranged between said or each adsorption/desorption chamber (220, 320) and said condenser (201, 301) and is in thermal contact with a source of heat at ambient temperature.

29. The device as claimed in claim 24, characterized in that it comprises, by way of heating means for heating said adsorption/desorption chambers, at least one heat exchanger (290), preferably at least N-1 heat exchangers, each arranged in such a way as to exchange heat between said zeolite adsorbent (Z) undergoing adsorption in said or one of said adsorption/desorption chamber(s) (121) of one stage and said zeolite adsorbent (Z) undergoing regeneration in said or one of said adsorption/desorption chamber(s) (223) of the next stage.

30. The device as claimed in claim 24, characterized in that it comprises, by way of cooling means for cooling said adsorption/desorption chambers, at least N-1 heat exchangers (280; 380) each arranged in such a way as to exchange heat between the refrigerating fluid in the evaporator (103; 203) of one stage and said zeolite adsorbent (Z) in said or each adsorption/desorption chamber (221, 222, 223; 320) of the next stage.

31. The device as claimed claim 24, characterized in that each stage comprises at least two adsorption/desorption chambers (121, 122, 123) each connected to said evaporator (103) via a respective upstream valve (131, 132, 133) and to said condenser (101) via a respective downstream valve (151, 152, 153).

32. The device as claimed in claim 31, characterized in that it comprises a means of controlling said valves (105) which is programmed to open and close said upstream and downstream valves in a cycle of concurrent operations, in which each chamber (121, 122, 123) performs in succession an adsorption step, for which the upstream valve (131) is open and the downstream valve (151) is closed, a regeneration or desorption step for which the downstream valve (153) is open and the upstream valve (133) is closed, and a post-regeneration cooling step for which the downstream valve (152) and the upstream valve (132) are closed.

33. The device as claimed in claim 24, characterized in that it is associated with a chamber (1) containing said product that is to be cooled, said final heat exchanger (26) being supported within said chamber in order to exchange heat between the refrigerating fluid in the evaporator (303) of the last stage and the product (P) in the liquid or vapor phase contained in said chamber.

34. A methane tanker equipped with a storage tank (1) for liquefied gas (P), with which a device as claimed in claim 33 is associated by way of a refrigerating re-liquefaction unit.

35. A gas-liquefaction plant comprising a cooling chamber (1) for cooling the gas (P) that is to be liquefied, which chamber is associated with a device as claimed in claim 33.

* * * * *